July 2, 1957 R. M. CHAVENEAUD 2,797,589
INTERMITTENT GEAR TRANSMISSION DEVICES
Filed Dec. 8, 1952 6 Sheets-Sheet 1

Inventor
Roger Marcel Chaveneaud
Attorneys:
Baldwin & Wight

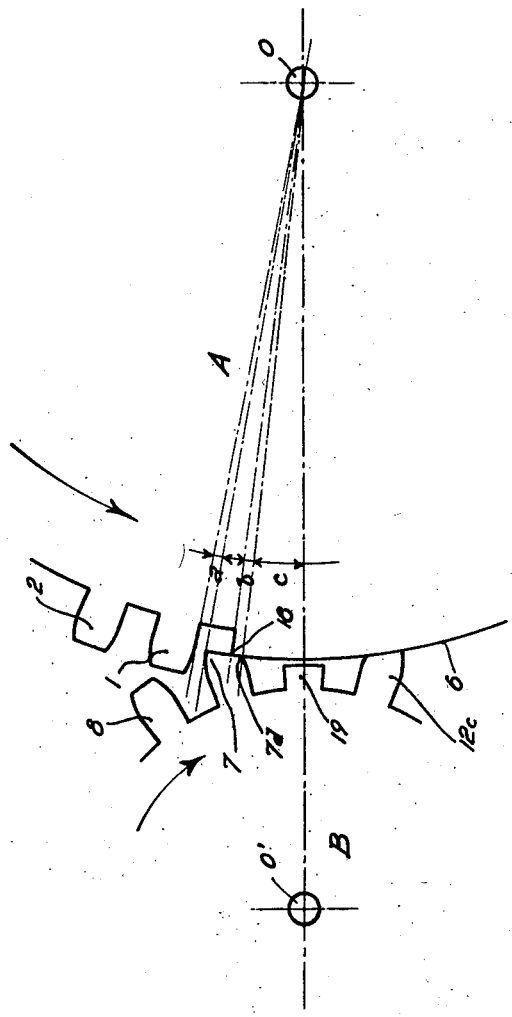

July 2, 1957 R. M. CHAVENEAUD 2,797,589
INTERMITTENT GEAR TRANSMISSION DEVICES
Filed Dec. 8, 1952 6 Sheets-Sheet 4
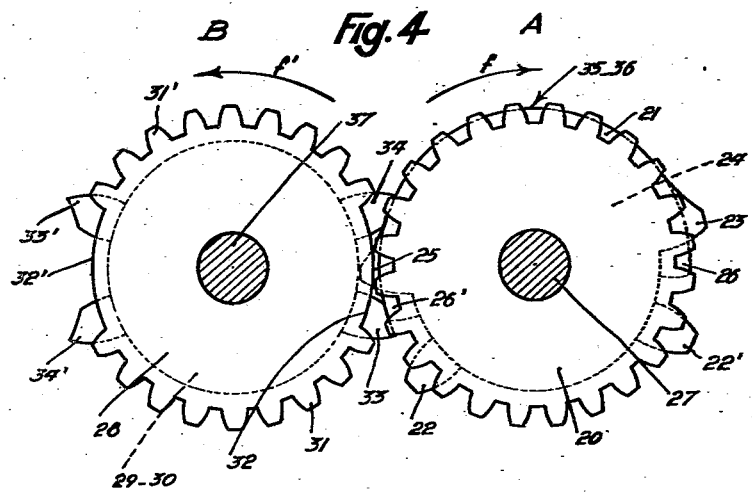
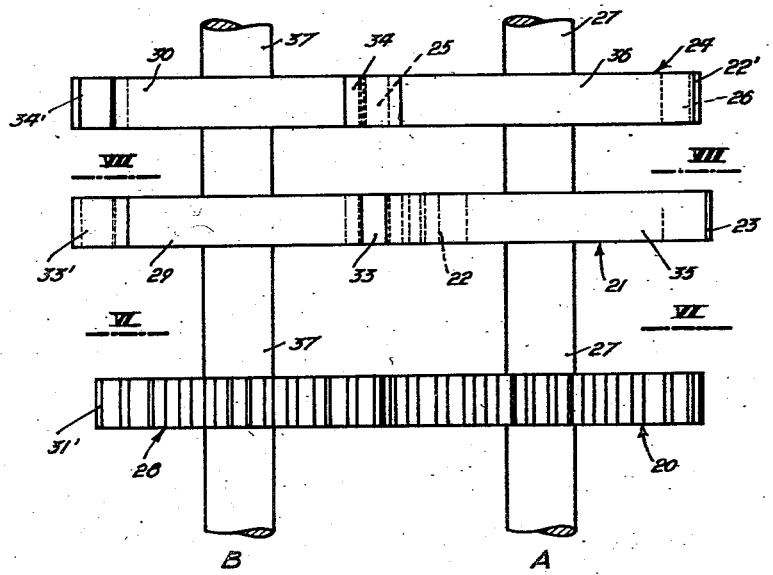
Inventor
Roger Marcel Chaveneaud
Attorneys
Baldwin & Wight July 2, 1957  R. M. CHAVENEAUD  2,797,589
INTERMITTENT GEAR TRANSMISSION DEVICES
Filed Dec. 8, 1952  6 Sheets-Sheet 5

Inventor
Roger Marcel Chaveneaud
Attorneys
Baldwin & Wight

United States Patent Office 2,797,589
Patented July 2, 1957

2,797,589

INTERMITTENT GEAR TRANSMISSION DEVICES

Roger Marcel Chaveneaud, Levallois-Perret, France, assignor to Simenca Societe Anonyme, Casablanca, Morocco, a corporation of France Application December 8, 1952, Serial No. 324,682

Claims priority, application France December 11, 1951

9 Claims. (Cl. 74—436)

In known devices for generating intermittent motions, such as, for instance, so-called "Maltese cross" or "Geneva stop" mechanisms, the stabilization of the controlled or driven member is generally ensured by the cooperation of concave circular arcs provided on said controlled member and of convex circular arcs provided on the controlling or driving member, these two circular arcs rotating respectively inside one another.

One drawback of such devices is that after a period of stabilization, the convex circular arc must have sufficiently advanced in rotation so as not to hinder the resumption of motion after the end of said stabilization period.

Now just before the motion is resumed, the controlled or driven member is really stabilized only in a reverse direction to that of the motion of the controlling or driving member.

On the other hand, it is well known that the intermittent action of the starting and stopping elements of the controlling or driving member is accompanied, both when the latter starts and stops, by a shock resulting from the discontinuity of the movement of the driven member.

The device which is an object of the invention makes it possible to obviate the above mentioned drawback which concerns the stabilization of the controlled or driven member in both directions of rotation of the driving and driven elements. To this effect, said device comprises a driving and stabilization mechanism which is much more reliable and efficient than those which are known heretofore and which makes it possible, on the one hand, to practically neglect the effect of the clearance which may exist between elements cooperating together, and on the other hand, to make it impossible that a premature resumption of the motion of the driven members may happen.

The main object of the invention is to obviate the above mentioned drawback concerning the shock resulting from the intermittent stopping of the controlled or driven member, by adding, to the above said device, accelerating and decelerating means incorporated in the starting and stopping elements which are part of the controlling or driving member.

One essential feature of the invention thus resides in that the intermittent driving and stabilization device comprises, on the one hand, a controlling or driving member comprising driving means constituted by teeth and stabilization means consisting of convex smooth parts and, on the other hand, a controlled or driven member comprising driving means constituted by at least one group of teeth and stabilization means consisting of concave smooth parts cooperating with the convex smooth parts of the controlling member, said latter member being, if necessary, provided with means capable of ensuring acceleration at the starting of the driven member and means ensuring the deceleration of said latter member a little time before its stopping.

In a first form of embodiment of the device which is an object of the invention, the driving and stabilization means for the controlling and controlled members are arranged in one plane.

In another form of embodiment of the device, the driving and stabilization means for the controlling and controlled members are distributed in several planes, acceleration and deceleration means being incorporated in the driving, in the starting and stopping means which are part of the controlling and driven members.

In the first form of embodiment mentioned above, the controlling or driving member consists in a pinion provided with at least one group of at least one tooth and convex smooth portions forming arcs in a circle, the diameter of which is close to that of the chamfering circumference of said teeth and the controlled or driven member consists in a pinion provided with at least one group of teeth designed for gearing with the driving pinion tooth or teeth with a view to obtaining the driving of the driven pinion, the extreme teeth of said groups of teeth being chamfered in such a manner that they provide concave smooth portions materializing circular arcs having as a radius that of the convex smooth portions of the driving pinion, so that at the time of stabilization the smooth portions in the shapes of circular arcs of the two members coincide, the teeth thus chamfered being capable of coming in contact with the convex smooth portions of the driving pinion when the latter present themselves without causing, however, the driving of said controlled member, and this all along the passings of said smooth portions before them.

It is remarkable that the present invention makes it possible to obtain pinions with chamfered teeth as just described, starting from pinions with normal teeth of the same dimensions.

The invention also makes it possible to preserve, on the controlled or driven pinion, between the teeth materializing one concave arc for stabilization, one or several teeth cut flush with a circular arc having as a center that of said pinion and such a radius that said flush teeth can behave like driving teeth with respect to a third pinion provided with a normal set of teeth without hindering the driving and stabilization ensured by the controlling or driving pinion.

In the second type of embodiment mentioned above, the driving means consist, on the one hand in a pinion having teeth over its entire periphery, keyed on the controlling or driving shaft and comprising at least one group of teeth capable of gearing with the teeth on the driving pinion, the said groups of teeth being separated by circular smooth portions having as a center that of the driven shaft and a diameter smaller than that of the root circumference or circumference of the hollow portions in the teeth of the said driven pinion, the arcs defined by said smooth portions being sufficiently large to allow the teeth of the controlling or driving pinion to move along their circular trajectories without driving the driven pinion as long as it is stabilized at the stopped position.

The stabilization means for the controlled or driven member consist of two wheels comprising each as many teeth as the driven pinion comprises circular smooth portions, said teeth being so chamfered that their tops offer concave surfaces generated by an imaginary cylinder having as a center that of the driving shaft and as a diameter that of convex smooth portions provided on two wheels carried by said shaft and located in the same planes, respectively, as the two wheels carried by the controlled or driven shaft; the concavities of the teeth of both driven wheels being made in such a manner that they complete the same arc, in pairs, on either side of the line through the centers of the driving and driven members.

Each of the wheels carried by the driving or controlling shaft is provided with a starting tooth acting alternately on the two stabilisation teeth of the controlled or driven wheel located on the same plane as said wheel.

One of the driving wheels carrying a starting tooth is provided with a deceleration tooth and with a so-called accompanying tooth alternately acting on the teeth of the driven wheel located on the same plane, a little before the stopping of said wheel.

The second controlling or driving wheel is provided, on the one hand, with an acceleration tooth alternately acting on the two teeth of the controlled or driven wheel located on the same plane as itself and, on the other hand, with a braking tooth cooperating with the deceleration tooth of the first driving wheel.

The characteristics just mentioned will be set forth in detail in the following description, with reference to the appended drawings wherein:

Fig. 3 is a profile view, on a larger scale, in partial representation, of the device shown in Fig. 1;

Fig. 4 is a profile view of the driving and driven members constituting a second form of embodiment of the device which is an object of the invention;

Fig. 5 is a plan view of said members;

Figure 1:
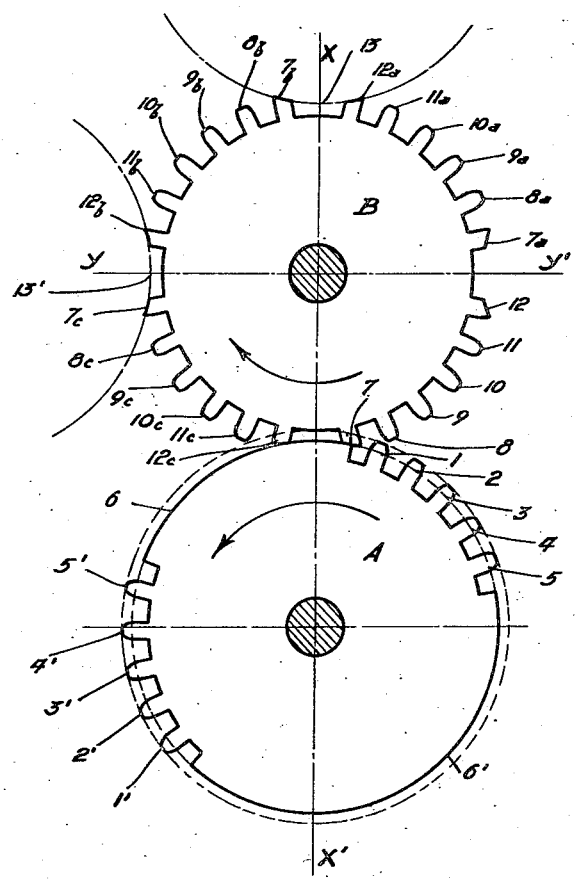
Fig. 1 is a profile view of a first form of embodiment of the device which is an object of the invention.

In a first form of embodiment of the object of the invention, the device comprises two members A and B (Fig. 1), A being assumed to be the controlling or driving member and B the controlled or driven member.

On the controlling member A, two groups of teeth are visible, 1, 2, 3, 4, 5 and 1', 2', 3', 4', 5'. Two smooth portions 6 and 6' separate these two sets of teeth and circular arcs having as a center that of element A. It will be noted, from the dotted lines, that the diameter of the circle comprising the arcs 6 and 6' is smaller than that of the chamfering circumference for the teeth 1, 2, 3, 4, 5 and 1', 2', 3', 4', 5'.

The controlled member B comprises four groups of teeth 7, 8, 9, 10, 11, 12: 7a, 8a, 9a, 10a, 11a, 12a; 7b, 8b, 9b, 10b, 11b, 12b, and 7c, 8c, 9c, 10c, 11c, 12c. On both sides of each one of the orthogonal axes xx' and yy' going through the center of the pinion B, the angle of the teeth facing said axis is ground off and the tops of these teeth are formed by an inclined concave surface. These planes, thus obliquely chamfered, constitute, considering for instance teeth 12a and 7b, the materialization of the circumference of an imaginary cylinder cutting the heads of the two teeth and shown in the figure by means of the dotted line 13. Considering teeth 12b and 7c, this cutting will be obtained in the same manner by a cylinder having a circumference 13'.

The imaginary arc 13 constitutes a concave stabilization arc, which, for coinciding with the convex smooth portions 6 and 6' of the controlling or driving member A, should have, as a center, that of said portions 6 and 6', i. e. that of member A.

As shown in Fig. 1, it will be assumed that member A is started in rotation in the direction shown by the arrow. In the position which is shown, the smooth stabilization sector 6 is in contact with teeth 12c and 7 of member B. These teeth bear on the sector 6 which moves in front of them without causing the driving of member B. When the member A rotates, the teeth 1, 2, 3, 4, 5 will successively gear with the teeth 7, 8, 9, 10, 11, 12 which will cause the driving of member B which will rotate in the reverse direction until sector 6' comes flush with teeth 12 and 7a, immobilizing again member B, for the whole duration of the passing of sector 6'. The same operation will be repeated, teeth 1', 2', 3', 4', 5' gearing with teeth 7a, 8a, 9a, 10a, 11a, 12a, until the stabilization sector 6 passes opposite teeth 12a and 7b.

For a better understanding of the advantages of the device according to the invention, there will be described hereinafter the partial operations of members of a known device and of a device as just described.

Figure 2:
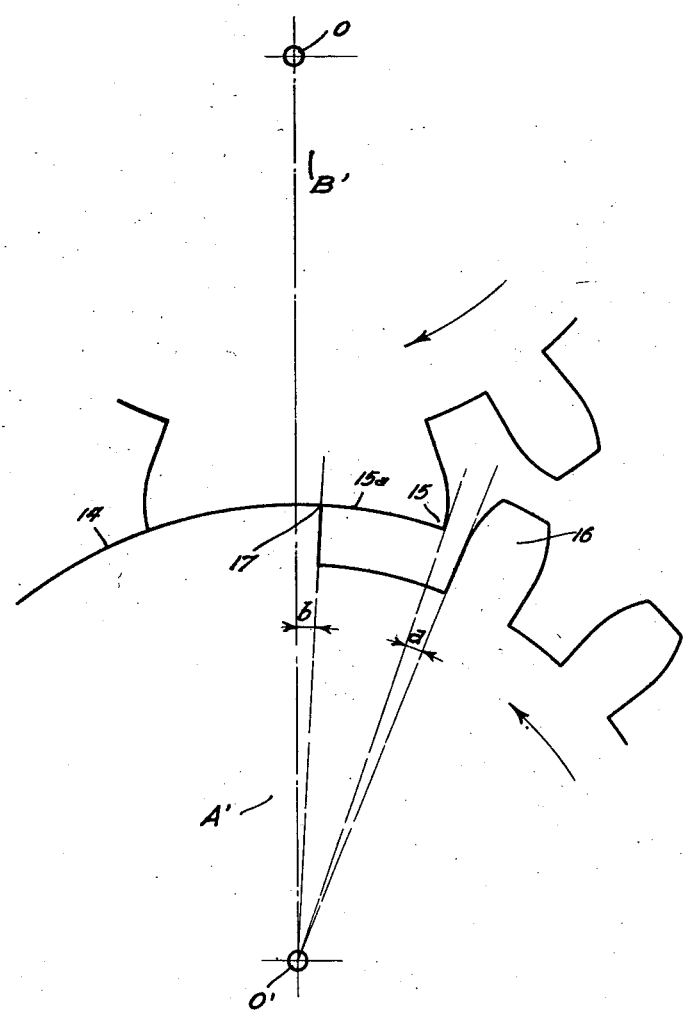
Fig. 2 is a profile view, in partial representation, of a known intermittent driving device called a "Geneva stop"

Fig. 2 represents the operation of a "Geneva stop" in which A' represents the controlling member and B' the controlled member.

In the position shown, the controlled member B' is stopped while the controlling member A' rotates, for instance in the direction shown by the arrow. The stabilization of the controlled member B' is ensured by the passing of the convex arc 14 in the concave arc 15a of tooth 15.

It may be seen, in Fig. 2, that member A' should rotate by an angle a, so that its tooth 16 should drive tooth 15 of member B'. The end 17 of the convex stabilization arc 14 should then reach the line joining the centers O, O'. This is the reason why angle b which expresses the arc portions in contact for the stabilization in the direction of motion, should be equal to angle a.

When the angle a decreases, angle b also decreases, and the stabilization in the direction of motion is less and less ensured until it becomes zero at the time of driving.

If, on the other hand, a force is urging element B' in this same direction, this element may thus, and according to the clearances between the stabilization arcs 15a and 17, prematurely start its motion, which may be detrimental to the correct operation of the mechanical assembly or the like, in which the device is being used.

On the contrary, if Fig. 3 is referred to, in which the same operation has been represented, but with a device according to the invention and in which A is the driving member and B the driven member, and if, as shown, the driven member B is stopped while the driving member A rotates in the direction of the arrow, the stabilization of the driven member B is ensured by the passing of the convex arc 6 in the concave chamfering arc of teeth 7 and 12c.

It will be seen, in Fig. 3, that member A should rotate by an angle a, for its tooth 1 to drive tooth 7 of member B. It is necessary, at that time, that the end 18 of the convex stabilization arc 6 leave the end 7d of the concave chamfering arc of tooth 7. This is the reason why angle b, which expresses the portions of stabilization arcs in contact for stabilization in the direction of the motion, should be equal to angle a. This angle, however, is spaced, angularly, by the amount c from the line of centers O, O'. It may thus be noted that before the beginning of the motion, member B is stabilized in the direction of the motion by an arc portion b, tending towards zero but offset by an angle c with respect to the line of centers O, O'. The result is that the influence of the clearances existing between the arcs has much less importance than in the case of Fig. 2, if, on the other hand, a force is acting on member B tending to rotate it in the direction designed for its driving by member A. There is no danger of the motion being prematurely resumed, which might be detrimentatl to the correct operation of the mechanical assembly or the like in which this device may be in use.

It will be noted, further, in Fig. 3, that the driven member B may comprise a ground tooth 19 located between the two cut teeth 7 and 12c, defining the concave stabilization arc. Said ground tooth 19 does not hinder the driving and stabilizing of member B and may cooperate in association with the other teeth of said member for a third pinion, normally toothed, not shown in the figure.

It is obvious that the controlling element A may be conceived as not having the shape of a pinion. In fact, it would be possible to imagine this member in the shape of a rack, and the latter would drive the controlled member B as described. The chamfered stabilization arcs in the tops of teeth 7 and 12c then having an infinite diameter, that is to say becoming straight lines.

In another form of embodiment of the object of the invention, also given by way of non limitative example, the device comprises an assembly A constituting the controlling or driving member and an assembly B constituting the controlled or driven member as described in the first form of embodiment.

In this modified embodiment, however, element B accomplishes half a turn for each turn of element A and the elements of said driving and driven members are distributed over three planes, sharply distinct, as clearly shown in Fig. 5 and are consequently divided into three parts for each one of said elements.

Figure 6:
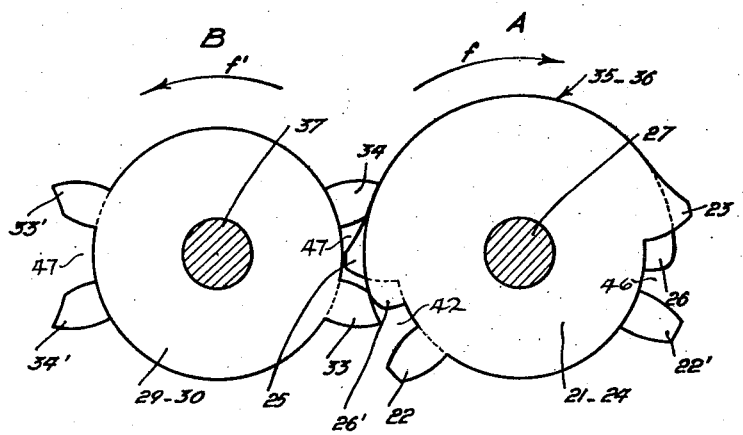
Fig. 6 is a section along line VI—VI in Fig. 5.
Figure 7:
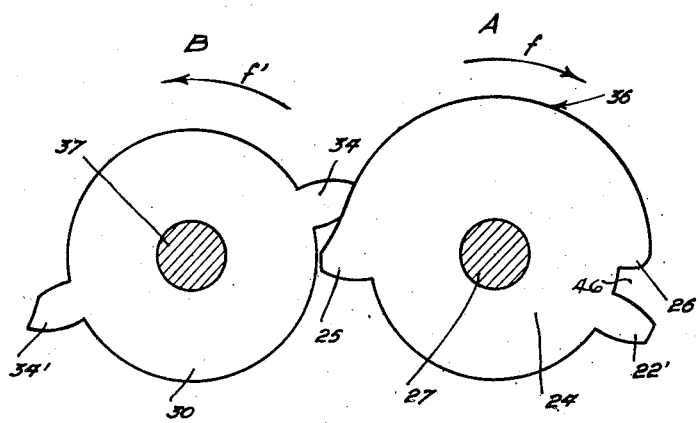
Fig. 7 is a section along line VII—VII of Fig. 5.

The controlling or driving assembly A thus comprises a first part consisting of a pinion 20 (Fig. 4) toothed over its entire periphery, a second part consisting of a wheel 21 (Fig. 6) comprising a homo-kinetic driving tooth 22, a stopping tooth 23 and a tooth 26' bounding an accompanying hollow, a starting accompanying hollow portion 42 located between said tooth 26' and said tooth 22 and finally a third part consisting of a wheel 24 (Fig. 7) comprising a starting tooth 25, a homo-kinetic driving tooth 22' and a tooth 26 bounding a stopping accompanying hollow portion 46 located between said tooth 26 and said tooth 22'.

The teeth 22 and 22' must contribute to the homo-kinetic driving of the driven assembly B, the teeth 25 and 26' with their special profiles, are to contribute to the acceleration, and the teeth 23 and 26, should, owing to their suitable profile, contribute to the deceleration of the speed of assembly B before its stopping.

Pinion 20 should, of course, be fixed on shaft 27 in order to ensure the homo-kinetic driving of pinion 28.

The pinion 20 and wheels 21 and 24 should be associated together and, in the example shown, are keyed on a single shaft 27.

The controlled or driven assembly B also comprises three parts corresponding to those of the controlling or driving assembly A, and located in respective planes. Said assembly B is thus constituted of three wheels 28, 29 and 30.

The wheel 28 (Fig. 4) is provided with two groups of teeth 31 and 31', separated from each other by two smooth arcs 32 and 32' which are parts of a circumference the diameter of which is slightly smaller than that of the root circumference of teeth 31 and 31'.

The wheel 29 (Fig. 6) comprises two similar teeth 33 and 33' for ensuring the stabilization of the assembly B in the direction of motion and for contributing to the starting and stopping of said assembly.

The wheel 30 (Fig. 7) is similar to wheel 29 but it bears two teeth 34 and 34' designed for ensuring the stabilization of the assembly B in the direction opposite to the motion and for contributing to the starting and stopping of said assembly.

For ensuring their stabilizing function, the teeth 33, 33' and 34, 34' are chamfered so as to form concave surfaces generated by an imaginary cylinder having as a center that of the shaft 27 and as a diameter that of the convex smooth portions 35 and 36 obtained respectively between the teeth 22, 26' and 23 of the wheel 21 and between the teeth 25 and 26 of the wheel 24 of the assembly A, the teeth pairs thus chamfered being located on either side of the line of centers of the driving and driven wheels in such a manner that an interval 47 be provided between them and located on said line of centers.

The three wheels 28, 29 and 30 should be associated together, and, in the example shown, they are keyed on a single shaft 37.

It will be obvious that the wheels 21 and 24 could just as well ensure the homo-kinetic driving of the wheels 29 and 30 by providing them, between their teeth 22 and 22', with a normal set of teeth gearing successively with an identical set of teeth provided, on the wheels 29 and 30, between their teeth 33 and 34 on the one hand and 33' and 34' on the other hand; the pinions 20 and 28 could then be omitted and due to this fact, the device could comprise only two planes instead of three.

Figure 8:
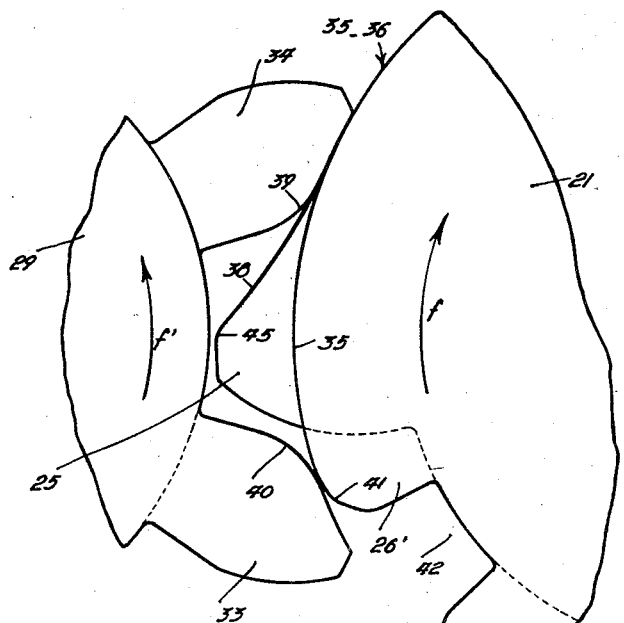
Fig. 8 is a profile view, on a large scale, of the parts ensuring the accelerated starting of the driven member.

The device operates as follows:

When the controlling or driving assembly A (Fig. 8) rotates in the direction of the arrow f, while the stabilization arcs 35 and 36 of its wheels 21 and 24 glide in the concave surfaces of the teeth 33 and 34 of the wheels 29 and 30 of the controlled or driven assembly B, the latter is stabilized, both in the direction of rotation and in the opposite direction.

When the stabilization arc 35 of the wheel 21 is on the point of losing contact with the concavity of tooth 33 of wheel 29, tooth 25 of wheel 24, on the contrary, begins to come in contact with tooth 34 of wheel 30. The profile of tooth 25 is designed for offering a concave side 38, acting in such a manner, on the convex side 39 of tooth 34 that tooth 25 can start the assembly B in an accelerated manner and this in accordance with the law chosen for materializing said profile, which also comprises a part 45 which contributes in homo-kinetically driving the unit B at the end of its acceleration.

Simultaneously, the side 40 of tooth 33 and the side 41 of the hollow portion 42 of wheel 21 act so as to keep the wheel 29 in accordance with the adopted law of motion.

The controlled or driven assembly B is thus held in both directions during its starting.

As the motion continues, tooth 25 leaves tooth 34 while tooth 33 is homo-kinetically developed in the hollow 42 against tooth 22.

Before said tooth 22 has finished its action, the driving motion is resumed by pinion 20, which can then homo-kinetically gear with the set of teeth 31 of wheel 28. This motion, effected in the direction of the arrow f' is continued until driving operation is carried on by teeth 22' and 26 of wheel 24 cooperating with one of teeth 34 or 34' of wheel 30 of unit B, in order to terminate the homo-kinetical driving operation prior to the deceleration.

This deceleration is obtained in a similar manner to the acceleration, but in the reverse direction.

Figure 9:
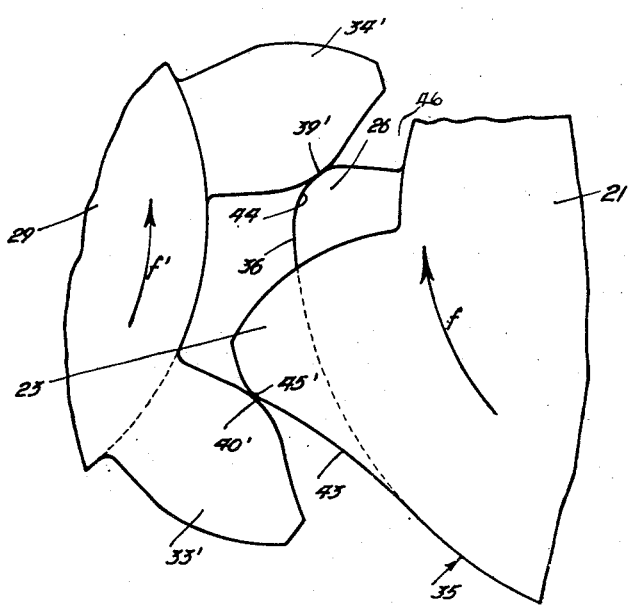
Fig. 9 is a profile view, on a large scale, of the parts ensuring the deceleration before the stopping of the driven member.

The deceleration is effected by the fact that the side 40' (Fig. 9) of tooth 33' of wheel 29 of the driven member B cooperates with the side 43 of tooth 23 of wheel 21 of the driving member A.

These two sides 40' and 43 are so designed that the driven member B slows down its motion with respect to that of the driven member A in such a manner that the driven member B reaches its stabilized position at a zero speed according to the chosen law of motion.

The action of the two teeth 33' and 23 is completed by that of the teeth 26 and 34' which, by cooperating by their respective sides 44 and 39' ensure the driving of the driven member B until its complete stopping in accordance with the same adopted law of motion.

To sum up, it will be seen that the acceleration means are essentially constituted by the tooth 25 of the driving element coacting with the tooth 34 of the driven element and by the tooth 26' of the driving element coacting with the tooth 33 of the driven element.

The driving side 38 of tooth 25 and the driven side 39 of tooth 34 are provided for ensuring, during their cooperation, between the driven element and the driving element, all speed ratios between zero and a maximum value equal to that of the ratio existing between the two elements at the time when they are homo-kinetically geared.

The retaining side 41 of tooth 26' of the driving element and the retaining side 40 of tooth 33 are determined for ensuring the provided ratios.

The deceleration means are constituted by a tooth 26 of the driving element coacting with the tooth 34' of the driven element and by a tooth 23 of the driving element simultaneously coacting with tooth 33' of the driven element.

The driving side 44 of tooth 26 of the driving element and the driven side 39' of tooth 34' of the driven element, on the one hand, the retaining side 45' of tooth 23 of the driving element and the retained side 40 of tooth 33' of the driven element, on the other hand, are designed for ensuring, during their cooperation, between the driven element and the driving element, all speed ratios between a maximum value equal to that of the ratio existing between the two elements at the time when they gear homo-kinetically, and zero.

This composition of the acceleration and deceleration means will be repeated as many times as it may be desired to create intermittences in the motion of the driven element.

The driving element will be provided with as many groups, consisting each of one tooth 25, one tooth 26', one tooth 26 and one tooth 23 as there are intermittences in the motion of the driven element for one complete rotation of the driving element.

The driven element will be provided with as many groups, consisting each of one tooth 34' and a second tooth 33', as there are intermittences provided during one complete rotation of the driven element.

It should also be noted that the direction of rotation of the device, due to the profiles imparted to the above mentioned teeth, is reversible from the controlling element A.

What I claim is:

1. An intermittent motion transmitting mechanism comprising a driving unit mounted for rotation on a first fixed axis, and a driven unit mounted for rotation on a second fixed axis parallel to said first axis, each of said units being provided with gear teeth at least certain of which are adapted to mesh to transmit rotational movement from said driving unit to said driven unit, said driving unit being provided with an arcuate concentric surface and said driven unit having a pair of its teeth spaced from each other and provided at their radial extremities with concentric arcuate surfaces having a radius equal to the radius of the arcuate surface of said driving unit and concentric and engageable therewith when said pair of teeth are equidistantly spaced on opposite sides of a plane passing through said axes, said pair of teeth, aside from said extremities thereof, being full gear teeth, said driven unit being free of full gear teeth between said pair of teeth.

2. An intermittent motion transmitting mechanism according to claim 1 wherein said pair of teeth of said driven unit are in the plane of and form part of the teeth of said driven unit adapted to mesh with said driving unit.

3. An intermittent motion transmitting mechanism according to claim 1 wherein said pair of teeth of said driven unit are in the plane of and form part of the teeth of said driven unit adapted to mesh with said driving unit, there being a gear tooth intermediate the teeth of said pair radially shorter than the remaining meshing teeth of said driven unit and being one of such teeth.

4. An intermittent motion transmitting mechanism comprising a driving wheel mounted for rotation on a first fixed axis, a driven wheel mounted for rotation on a second fixed axis parallel to said first axis, each of said wheels being provided with gear teeth adapted to mesh to transmit rotational movement from said driving wheel to said driven wheel, and a smooth concentric surface interrupting the teeth of said driving wheel, two of the teeth of said driven wheel having smooth cut-away radially outer ends formed as concentric arcs having a radius equal to the arcuate smooth portion of said driving wheel and engageable therewith when said two teeth are equidistantly spaced on opposite sides of a plane passing through said axes.

5. An intermittent motion transmitting mechanism according to claim 4 wherein the radius of the smooth arcuate surface of said driving wheel is substantially less than the maximum radius of the teeth of said driving wheel, one of the teeth of said driven wheel lying intermediate said two teeth and projecting radially outwardly beyond the roots of such teeth but having clearance between its extremity and the smooth arcuate surface of said driving wheel.

6. An intermittent motion transmitting mechanism comprising a driving unit mounted for rotation on a first fixed axis, a driven unit mounted for rotation on a second fixed axis parallel to said first axis, a wheel having gear teeth forming a part of said driving unit, a wheel having gear teeth forming part of said driven unit and mounted in the plane of said first wheel, said gear teeth being adapted to mesh with each other, the teeth on said first wheel being continuous therearound and the teeth of said second wheel having an interrupted portion, holding means offset from the plane of said first wheel and forming a part of said driving unit, said holding means having arcuate surface portions concentric with said first axis, and a pair of spaced teeth lying within the interruption in the teeth of said driven unit and having arcuate radially outer ends concentric with and slidable over said arcuate surface portions when said pair of teeth are equidistantly spaced on opposite sides of a plane passing through said axes.

7. An intermittent motion transmitting mechanism according to claim 6 provided with a cam member fixed with respect to said driving unit and projecting radially outwardly relative to said arcuate surface portions for engagement with a tooth of said pair to accelerate said driven unit as the following end of said arcuate surface portions passes beyond one tooth of said pair.

8. An intermittent motion transmitting mechanism according to claim 6 wherein said driving unit is provided adjacent the leading end of said arcuate surface portions with a cam projection extending radially outwardly beyond said arcuate surface portions and engageable with one tooth of said pair, as said two teeth approach a position in slidable engagement with said arcuate surface portions, to decelerate said driven unit.

9. An intermittent motion transmitting mechanism according to claim 6 wherein the teeth of said pair are in planes spaced along said driven unit, said arcuate surface portions being formed on cam wheels lying respectively in the planes of the teeth of said pair, said arcuate surface portions being respectively provided adjacent opposite ends thereof with outwardly curved cam members one of which is engageable with one tooth of said pair to accelerate said driven unit as said arcuate surface portions move beyond one tooth of said pair and the other of which is engageable with the other tooth of said pair to decelerate said driven unit as the arcuate radially outer ends of the teeth of said pair approach a position in sliding engagement with said arcuate surface portions.

References Cited in the file of this patent

UNITED STATES PATENTS

| 1,051,929 | Van Nuis et al. | Feb. 4, 1913 |
| 1,846,785 | Breitling | Feb. 23, 1932 |
| 2,243,283 | Morrison et al. | May 27, 1941 |

FOREIGN PATENTS

| 707,242 | Germany | June 17, 1941 |